United States Patent
Govindan et al.

(10) Patent No.: US 10,031,801 B2
(45) Date of Patent: Jul. 24, 2018

(54) CONFIGURABLE RELIABILITY FOR MEMORY DEVICES

(71) Applicant: Microsoft Technology Licensing, LLC, Redmond, WA (US)

(72) Inventors: Sriram Govindan, Redmond, WA (US); Bryan Kelly, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/956,335

(22) Filed: Dec. 1, 2015

(65) Prior Publication Data

US 2017/0153939 A1    Jun. 1, 2017

(51) Int. Cl.
| | | |
|---|---|---|
| *G06F 11/00* | (2006.01) | |
| *G06F 11/10* | (2006.01) | |
| *G06F 3/06* | (2006.01) | |

(52) U.S. Cl.
CPC .......... *G06F 11/1048* (2013.01); *G06F 3/064* (2013.01); *G06F 3/0619* (2013.01); *G06F 11/1076* (2013.01); *G06F 3/0673* (2013.01)

(58) Field of Classification Search
CPC .... G06F 11/1076; G06F 3/0619; G06F 3/064; G06F 3/0673
USPC .................................................. 714/763, 764
See application file for complete search history.

(56) References Cited

U.S. PATENT DOCUMENTS

| | | | | |
|---|---|---|---|---|
| 5,758,050 | A  * | 5/1998 | Brady | G06F 3/0607 |
| | | | | 711/173 |
| 7,292,950 | B1 * | 11/2007 | Resnick | G06F 11/1044 |
| | | | | 700/1 |
| 8,645,610 | B2 | 2/2014 | Chang et al. | |
| 8,688,899 | B2 | 4/2014 | Nellans et al. | |
| 8,707,110 | B1 | 4/2014 | Shaeffer et al. | |
| 8,930,647 | B1 | 1/2015 | Smith | |
| 2006/0256615 | A1* | 11/2006 | Larson | G06F 11/106 |
| | | | | 365/185.09 |
| 2012/0079342 | A1* | 3/2012 | Lu | G06F 11/1064 |
| | | | | 714/755 |
| 2013/0091405 | A1* | 4/2013 | Von Thun | G06F 11/1012 |
| | | | | 714/773 |
| 2013/0111295 | A1* | 5/2013 | Li | G06F 11/1064 |
| | | | | 714/755 |
| 2014/0095956 | A1* | 4/2014 | Ozdemir | G06F 11/1048 |
| | | | | 714/755 |
| 2014/0108885 | A1* | 4/2014 | Loh | G06F 11/1044 |
| | | | | 714/763 |

(Continued)

*Primary Examiner* — Albert Decady
*Assistant Examiner* — Osman M Alshack
(74) *Attorney, Agent, or Firm* — Davin Chin; Chin IP, PLLC (57) ABSTRACT

Technology relating to configurable reliability schemes for memory devices is disclosed. The technology includes a memory controller that selectively controls at least a type or an extent of a reliability scheme for at least a portion of a memory device. The technology also includes a computing device that can dynamically select and employ reliability schemes from a collection of different reliability schemes. A reliability scheme may be selected on a per-process, per-allocation request, per-page, per-cache-line, or other basis. The reliability schemes may include use of parity, use of data mirroring, use of an error correction code (ECC), storage of data without redundancy, etc.

19 Claims, 7 Drawing Sheets

(56) References Cited

U.S. PATENT DOCUMENTS

| | | |
|---|---|---|
| 2014/0189706 A1 | 7/2014 | Baek et al. |
| 2014/0201461 A1 | 7/2014 | Dalal et al. |
| 2015/0012721 A1 | 1/2015 | Karamcheti et al. |
| 2015/0248316 A1* | 9/2015 | Mogul .................. G06F 11/073 714/6.11 |
| 2016/0266824 A1* | 9/2016 | Niu ........................ G06F 12/02 |
| 2016/0284424 A1* | 9/2016 | Das ........................ G11C 29/42 |

* cited by examiner

CONFIGURABLE RELIABILITY FOR MEMORY DEVICES

BACKGROUND

Operating memory devices (e.g., random access memories, dynamic memories, static memories, caches, buffers, etc.) are often employed by computing devices for storing run-time data, executable instructions, and other information. Such memory devices are fairly reliable, and generally support relatively high speed operation of the computing device. However, memory errors may occasionally occur due, for example, to faulty memory cells, other hardware problems, out-of-specification operation, environmental conditions, and other issues.

Various reliability schemes have been developed for detecting and/or mitigating the effect of errors in operating memory devices. For example, computing devices and/or operating memory devices may employ parity bits to detect memory errors, or computing and/or operating memory devices may employ an error correction code (ECC) to correct memory errors. However, in conventional technology, the reliability scheme employed by a computing device depends directly on the hardware configuration of that device, and does not change once that device is deployed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale.

For a better understanding of the present invention, reference will be made to the following Detailed Description, which is to be read in association with the accompanying drawings, wherein.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of embodiments of the technology. It is intended that the terminology used in this disclosure be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section. For example, the term "based on" or "based upon" is not exclusive and is equivalent to the term "based, at least in part, on" and includes being based on additional factors, some of which are not described herein. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Introduction

Technology relating to configurable reliability schemes for operating memory devices is disclosed. The technology includes a memory controller that selectively controls at least a type or an extent of a reliability scheme for at least a portion of an operating memory device. The technology also includes a computing device that can dynamically select and employ reliability schemes from a collection of different reliability schemes. A reliability scheme may be selected on a per-process, per-allocation request, per-page, per-cache-line, or other basis. The reliability schemes may include use of parity, use of data mirroring, use of an error correction code (ECC), storage of data without redundancy, etc.

As density of operating memory devices continues to increase, it has become increasingly difficult to ensure the reliability of such memory. For example, use of lower voltages in operating memory devices, smaller cell sizes, storage of multiple bits per memory cell, or the like, increase the difficulty of accurately maintaining data in operating memory devices. These challenges are also exacerbated by the continuing increase in processor and bus speeds because these speeds provide less time for accurate storage and retrieval of data from memory cells. Techniques such as data mirroring, ECC, use of parity bits or other error detection codes (EDC), or the like, may be employed to detect or potentially correct raw bit errors after they take place on the operating memory device. However, these techniques reduce the amount of data from the computing device's processes that can be stored in the operating memory device(s) of the computing device.

In some environments, certain processes can tolerate memory errors and thus may not require strong error protection. Also, due to process variation, most memory errors occur on a small number of memory devices. Thus, strong error protection may not be needed after a memory device has been tested over an extensive period, e.g., after a particular memory device has been used in a production environment for a given amount of time. However, in conventional technology, the reliability scheme employed by a computing device depends directly on the hardware configuration of that device and thus is not changed once that device is deployed.

Also, there has conventionally been an interdependence between the operating memory device(s) for a computing device and the reliability scheme employed by that device. Accordingly, traditional computing devices generally support only a single reliability scheme that is tied to the particular type of operating memory modules in that computing device. For example, a computing device built with ECC memory modules would employ an ECC reliability scheme. Accordingly, it may be difficult or impossible to change the reliability scheme of a conventional computing device after it has been manufactured.

However, different reliability schemes may be useful for different processes. For example, different processes may be associated with different requirements, effects of failure, or service level agreements (SLA). Thus, different processes may not all require the same level of memory reliability. As a more specific example, a mission critical or production process may be associated with more stringent uptime or other reliability requirements than a less important process and thus may benefit from greater memory reliability. As other example, the effect of a failure of a hypervisor may be more severe than the effect of a failure of an individual virtual machine and thus a more stringent operating memory reliability scheme may be required for the hypervisor.

The presently disclosed technology may be employed to enable reliability schemes for operating memory devices to be selected, provisioned, or changed after a computing device has been manufactured, e.g., after testing of the computing device, in conjunction with a boot of the computing device, in conjunction with allocation of operating memory, or in conjunction with a write to operating memory. In addition, the presently disclosed technology decouples the selection of a computing device's operating memory from reliability schemes usable on that computing device. Accordingly, the present technology may be employed to provide a more robust reliability scheme for the mission critical or production process than for a less important process, to employ a higher utilization ratio reliability scheme for a virtual machine than for a hypervisor, or the like.

Illustrative Computing Device

Figure 1:
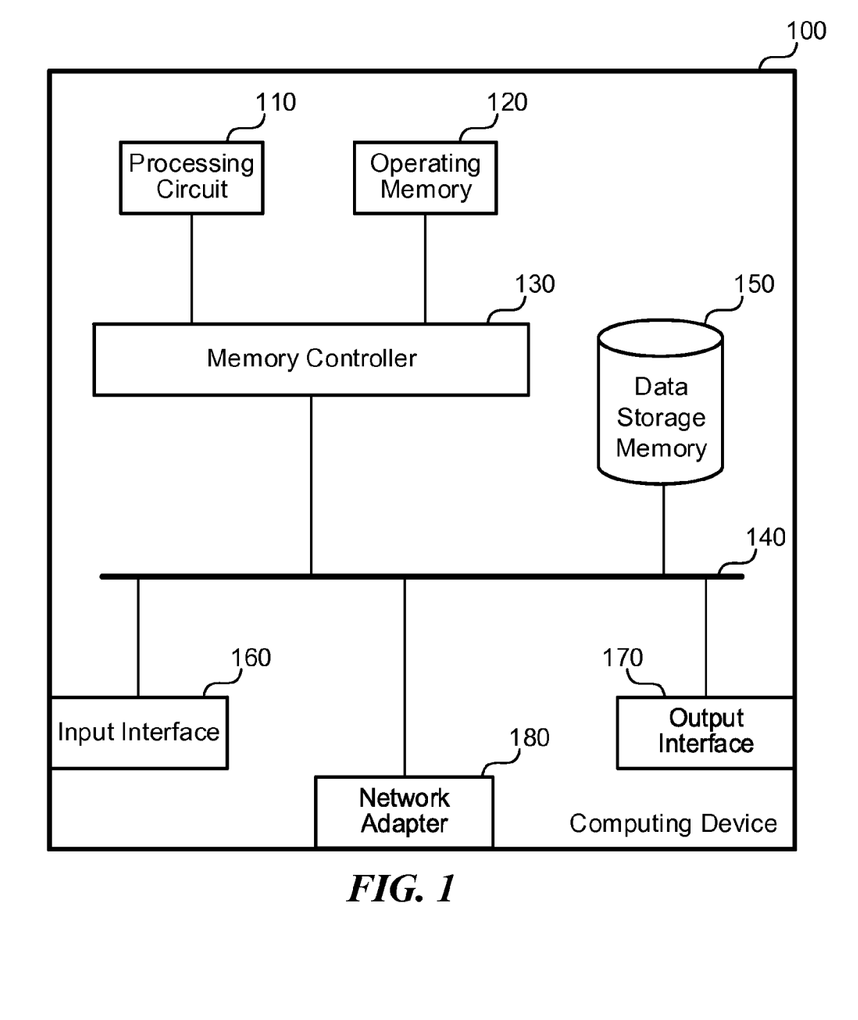
FIG. 1 is a diagram illustrating one example of a suitable computing device according to aspects of the disclosed technology.

FIG. 1 is a diagram illustrating one example of computing device 100 in which aspects of the technology may be practiced. Computing device 100 may be virtually any type of general- or specific-purpose computing device. For example, computing device 100 may be a user device such as a desktop computer, a laptop computer, a tablet computer, a display device, a camera, a printer, or a smartphone. Likewise, computing device 100 may also be server device such as an application server computer, a virtual computing host computer, or a file server computer. As illustrated in FIG. 1, computing device 100 includes processing circuit 110, operating memory 120, memory controller 130, data storage memory 150, input interface 160, output interface 170, and network adapter 180. Each of these afore-listed components of computing device 100 includes at least one hardware element.

Computing device 100 includes at least one processing circuit 110 configured to execute instructions, such as instructions for implementing the above-described processes or technology. The aforementioned instructions, along with other data (e.g., datasets, metadata, operating system instructions, etc.), may be stored in operating memory 120 during run-time of computing device 100. Operating memory 120 may also include any of a variety of data storage devices/components, such as volatile memories, semi-volatile memories, random access memories, static memories, caches, buffers, or other media used to store run-time information. However, operating memory 120 specifically does not include or encompass communications media, any communications medium, or any signals per se. In one example, operating memory 120 does not retain information when computing device 100 is powered off. Rather, computing device 100 is configured to transfer instructions from a non-volatile data storage component (e.g., data storage component 150) to operating memory 120 as part of a booting or other loading process.

Memory controller 130 is configured to interface processing circuit 110 to operating memory 120, and to dynamically implement one or more reliability schemes for at least a portion of operating memory 120. For example, memory controller 130 may be configured to interface data between operating memory 120 and processing circuit 110, and to implement a selected reliability scheme in conjunction with interfacing the data. Further, memory controller 130 may be configured to emulate multiple reliability offerings (e.g., ECC, EDC, parity, etc.), regardless of the type of operating memory employed in computing device 100.

Memory controller 130 may also be configured to control an extent to which a reliability scheme is implemented for at least the portion of operating memory 120. For example, memory controller 130 may control a strength of an ECC implemented for a portion of an operating memory device, a strength of an EDC employed for another operating memory device, a ratio bits of an operating memory device exposed to a client process for data storage versus for the bits employed for redundancy/reliability, or the like.

As illustrated, memory controller 130 also interfaces processing circuit 110 to bus 140, e.g., to enable processing circuit 110 to communicate with data storage memory 150, input interface 160, output interface 170, and network adapter 180. In other words, memory controller 130 may be configured to provide "northbridge" functionality for computing device 100.

In computing device 100, data storage memory 150, input interface 160, output interface 170, and network adapter 180 are interfaced to processing circuit 110 by bus 140 via memory controller 130. Although, FIG. 1 illustrates bus 140 as a single passive bus, other configurations, such as a "southbridge," a collection of buses, a collection of point to point links, or any collection thereof may also be suitably employed for interfacing data storage memory 150, input interface 160, output interface 170, or network adapter 180 to processing circuit 110.

In computing device 100, data storage memory 150 is employed for long-term non-volatile data storage. Data storage memory 150 may include any of a variety of non-volatile data storage devices/components, such as non-volatile memories, disks, disk drives, hard drives, solid-state drives, or any other media that can be used for the non-volatile storage of information. However, data storage memory 150 specifically does not include or encompass communications media, any communications medium, or any signals per se. In contrast to operating memory 120, data storage memory 150 is employed by computing device 100 for non-volatile long-term data storage, instead of for run-time data storage.

Also, computing device 100 may include or be coupled to any type of computer-readable media such as computer-readable storage media (e.g., operating memory 120 and data storage memory 150) and communication media (e.g., communication signals and radio waves). While the term computer-readable storage media includes operating memory 120 and data storage memory 150, this term specifically excludes and does not encompass communications media, any communications medium, or any signals per se.

Computing device 100 also includes input interface 160, which may be configured to enable computing device 100 to receive input from users or from other devices. In addition, computing device 100 includes output interface 170, which may be configured to provide output from computing device 100. In one example, output interface 170 includes a frame buffer, graphics processor, graphics processor or accelerator, and is configured to render displays for presentation on a separate visual display device (e.g., a monitor, projector, virtual computing client computer, etc.). In another example, output interface 170 includes a visual display device and is configured to render and present displays for viewing.

In the illustrated example, computing device 100 is configured to communicate with other computing devices via network adapter 180. Network adapter 180 may include a wired network adapter, e.g., an Ethernet adapter, a Token Ring adapter, or a Digital Subscriber Line (DSL) adapter. Network adapter 180 may also include a wireless network adapter, for example, a Wi-Fi adapter, a Bluetooth adapter, a ZigBee adapter, a Long Term Evolution (LTE) adapter, or a 5G adapter.

Although computing device 100 is illustrated with certain components configured in a particular arrangement, these components and arrangement are merely one example of a computing device in which the technology may be employed. In other examples, data storage memory 150, input interface 160, output interface 170, or network adapter 180 may be directly coupled to processing circuit 110, or be coupled to processing circuit 110 via memory controller 130 or another bridge. Other variations of the technology are possible.

Figure 2:
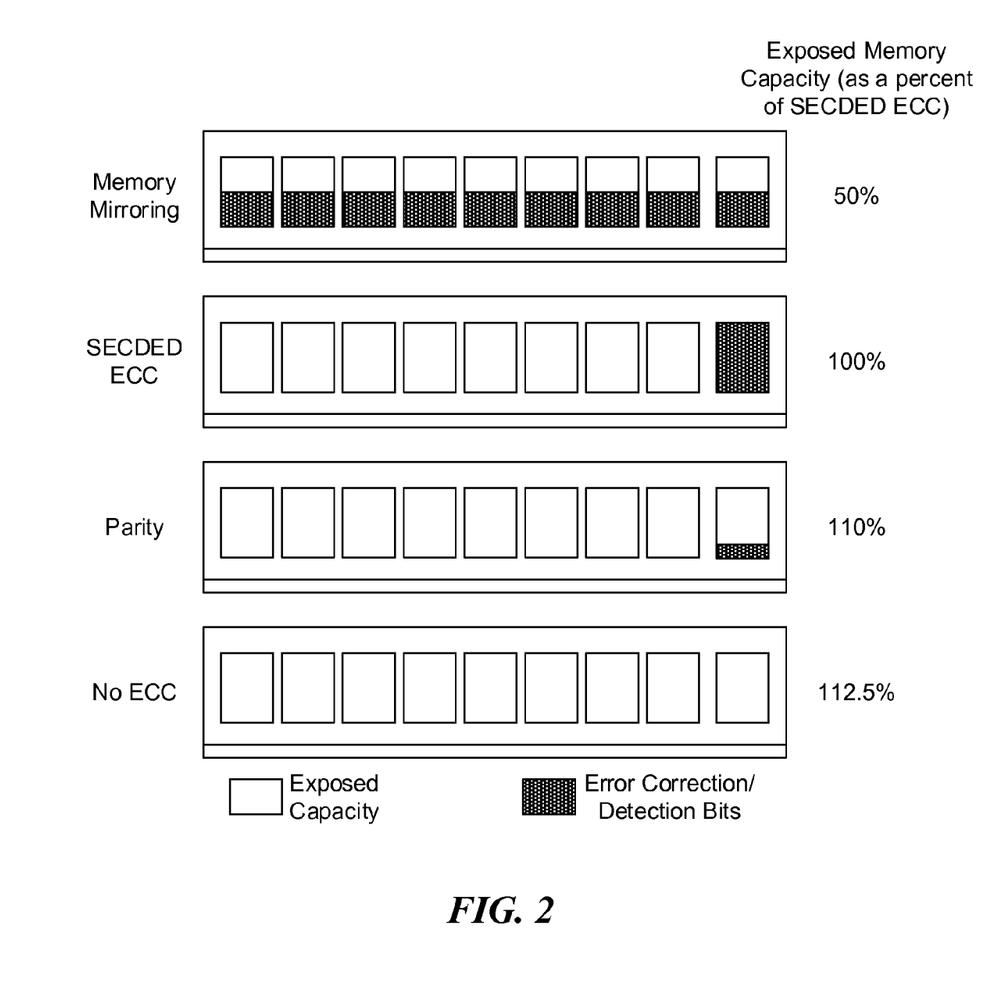
FIG. 2 illustrates example reliability schemes according to aspects of the disclosed technology.

FIG. 2 illustrates example reliability schemes suitable for implementation in memory controller 130 of FIG. 1 according to aspects of the disclosed technology. More specifically, FIG. 2 illustrates examples of relative proportions of operating memory space exposed to client processes versus operating memory space used to enabling selected reliability schemes for the exposed portions of memory.

In FIG. 2, the exposed memory capacities are presented relative to the exposed memory capacity for a Single Error Correction and Double Error Detection (SECDED) code reliability scheme. In this example, use of mirroring instead of SECDED reduces the exposed memory capacity by 50 percent, while use of parity instead of SECDED increases the exposed memory capacity by 10 percent. Alternately, the use of no reliability scheme (e.g., no ECC or EDC) increases the exposed memory capacity by 12.5 percent.

In FIG. 2, particular portions of operating memory chips and operating memory modules are shown as either being exposed, or for use by a reliability scheme. However, FIG. 2 is merely intended to illustrate the ratios of exposed operating memory to that used for implementing the reliability schemes. As such, the particular portions of the operating memory chips/modules depicted may not reflect the actual portions exposed/used for reliability schemes.

As the present technology decouples the traditional dependence of reliability schemes on the specific type of memory modules, the operating memory used for implementing a reliability scheme could be anywhere within a computing device's memory map. In addition, the present technology allows memory reliability provisioning to be flexibly tuned such that a single computing device's operating memory can be partitioned into multiple regions with different reliability-capacity tradeoffs. Examples of such allocations are discussed below in conjunction with FIGS. 3 and 4.

Figure 3:
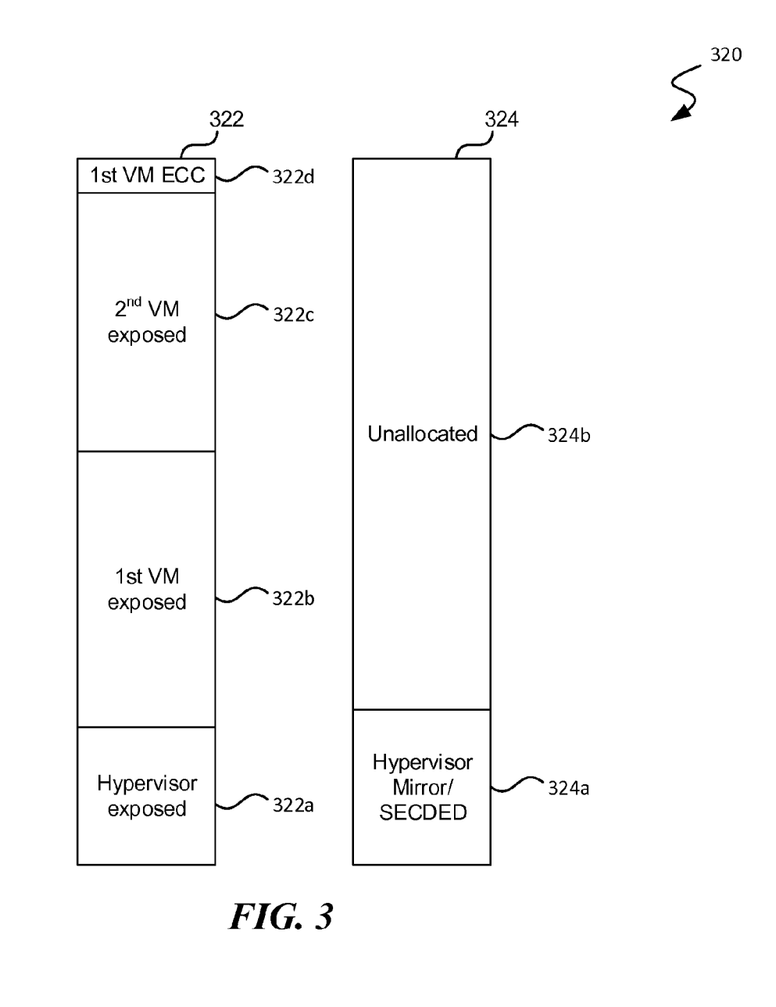
FIG. 3 illustrates an example map of operating memory according to aspects of the disclosed technology.
Figure 4:
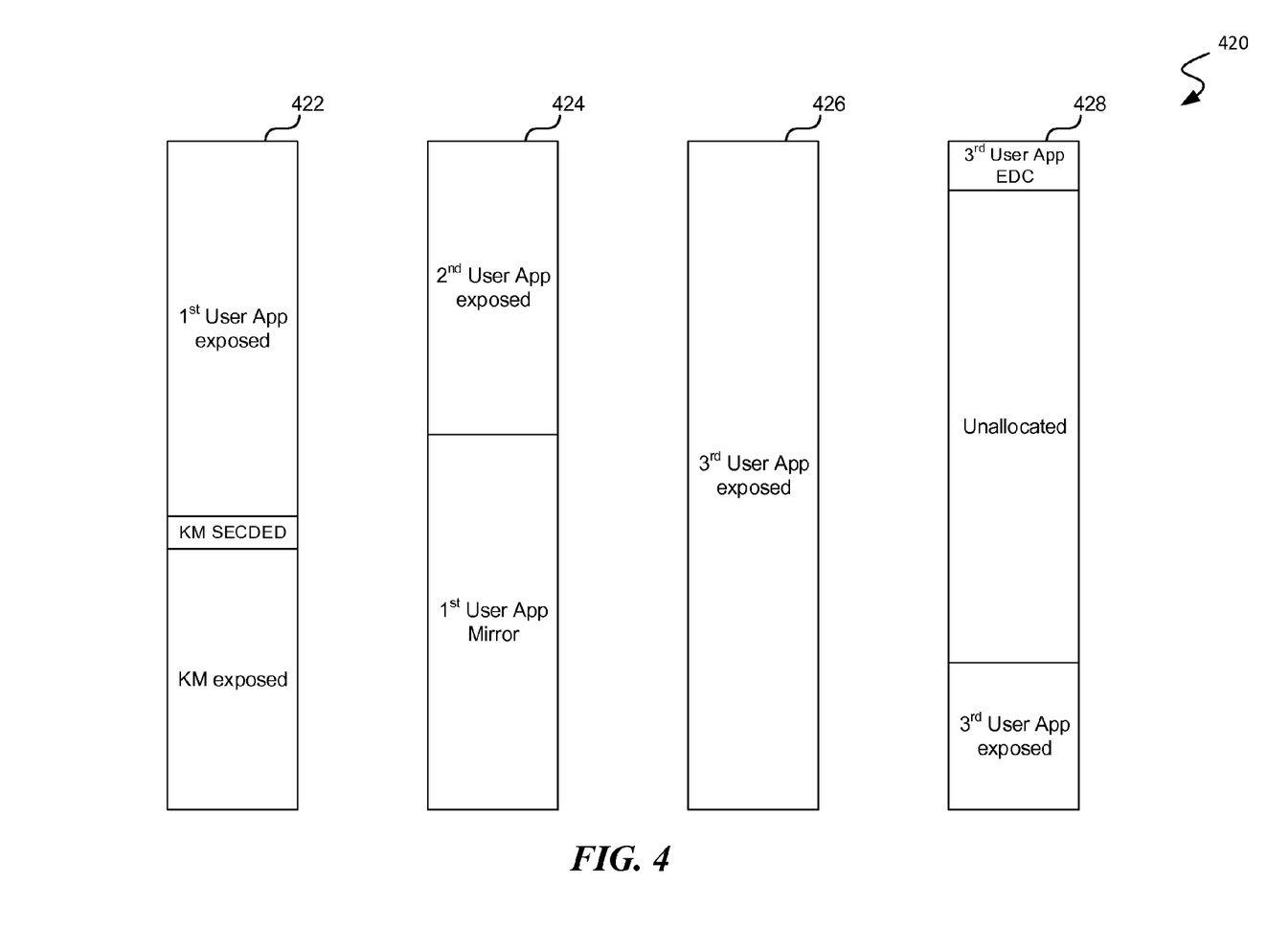
FIG. 4 illustrates another example map of operating memory according to aspects of the disclosed technology.

FIGS. 3 and 4 illustrate example maps of operating memory according to aspects of the disclosed technology. More specifically, FIG. 3 is a memory map of operating memory 320 of a virtual host computing device while FIG. 4 is a memory map of operating memory 420 of another computing device. For both clarity and ease of illustration, FIGS. 3 and 4 illustrate a relatively small number of processes. However, other computing devices may have more complex memory maps and significantly more processes.

As shown in FIG. 3, operating memory 320 includes first memory module 322 and second memory module 324. Five portions of operating memory 320 are allocated, i.e., portions 322a, 322b, 322c, 322d, and 324a, while portion 324b is unallocated. Of the allocated portions, portions 322a, 322b, and 322c are allocated and respectively exposed for use by a hypervisor, a first virtual machine, and a second virtual machine. Also, portion 322d is allocated for use in an ECC reliability scheme for the first virtual machine, and portion 324a is allocated for use for both mirroring and SECDED reliability schemes for the hypervisor.

FIG. 4 illustrates a memory map for a computing device having operating memory 420 made up of four memory modules 422, 424, 426, and 428. In this example, memory has been allocated to kernel mode (KM) processes and to three user mode applications. Also, portions of operating memory 420 have been allocated for a SECDED reliability scheme for the KM processes, for a mirroring reliability scheme for the first user mode application, and for a EDC reliability scheme for the third user mode application.

As shown in the examples of FIGS. 3 and 4, the present technology provides the flexibility to provide differing levels of operating memory redundancy/reliability for various processes executing on a computing device. In contrast to conventional technology, these various levels of redundancy/reliability can be provided regardless of the type of memory modules/devices used in the computing device.

Figure 5:
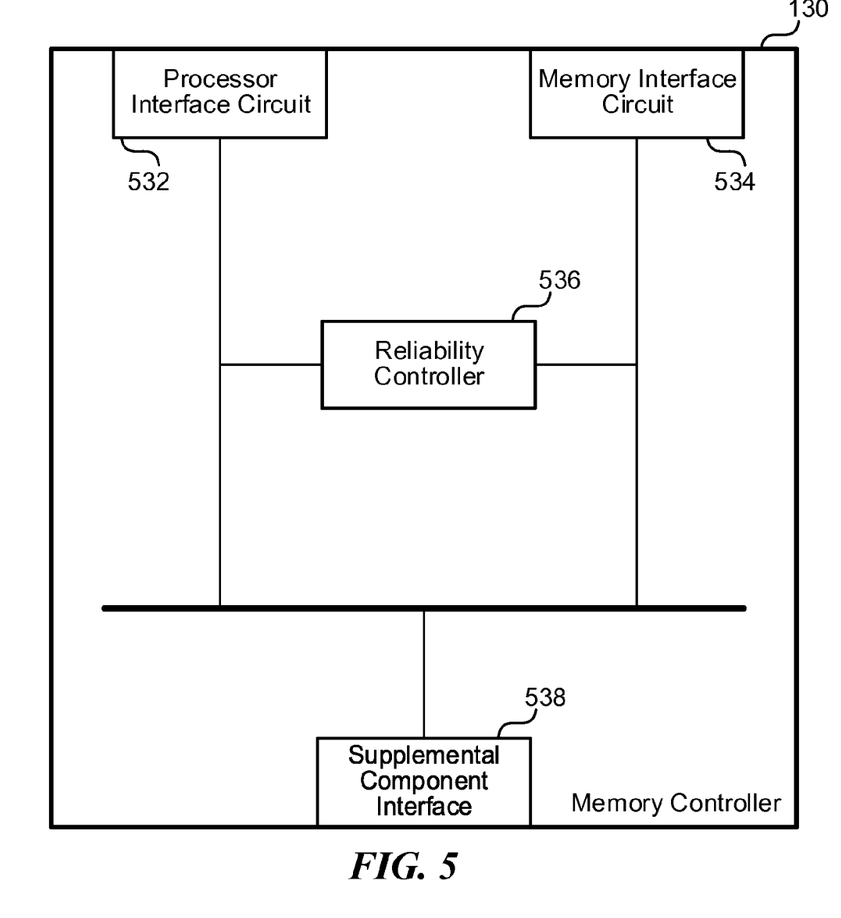
FIG. 5 is a block diagram illustrating an example memory controller according to aspects of the disclosed technology.

FIG. 5 is a block diagram illustrating an example of memory controller 130 of FIG. 1 according to aspects of the disclosed technology. As illustrated, memory controller 130 includes processor interface circuit 532, memory interface circuit 534, reliability controller 536, and supplemental component interface 538. Memory controller 130 is configured to implement multiple types of reliability schemes or control multiple extents to which the reliability schemes are to be implemented for different portions of operating memory devices.

Memory controller 130 may be embodied as a processor interface integrated circuit (IC), or as an interface component on a processor IC. Additionally, memory controller 130 may be embodied on a field programmable gate array (FPGA), a programmable logic device (PLD), a complex programmable logic device (CPLD), an application specific integrated circuit (ASIC), or the like. In any event, memory controller 130 includes at least one hardware element.

Processor interface circuit 532 is configured to interface memory controller 130 to a processing circuit such as processing circuit 110 of FIG. 1. For example, processor interface circuit 532 may be configured to receive data from a processing circuit so that memory controller 130 can write the data to operating memory, or to send data retrieved from operating memory to a processing circuit. Additionally, processor interface circuit 532 may be configured to receive allocation requests from a processing circuit, and to pass such requests to reliability controller 536. As one example, an allocation request may include an indication of a requested reliability scheme. Processor interface circuit 532 may include various latches, registers, level shifters, state machines, buffers, or other analog or digital logic components arranged to couple memory controller 130 to a processing circuit.

Memory interface circuit 534 is configured to be coupled to operating memory such as operating memory 120 of FIG. 1, and to interface memory controller 130 to operating memory. For example, memory interface circuit 534 may be configured to write data from a processing circuit or other source to operating memory, or to retrieve data from operating memory for the processing circuit or other recipient. Memory interface circuit 534 may also be configured to treat operating memory as raw storage, e.g., memory interface circuit 534 or memory controller 130 may write process data (i.e., the raw data output by a process executing on the computing device instead of reliability data generated by reliability controller 536 for the implementation of a reliability scheme) to locations typically reserved for ECC or parity data, and may write reliability data to locations typically reserved for process data. Memory interface circuit 534 may include various latches, registers, level shifters, state machines, buffers, or other analog or digital logic components arranged to couple memory controller 130 to a processing circuit.

Reliability controller 536 is configured to selectively control the type(s) of reliability scheme(s) implemented for operating memory or the extent to which the reliability scheme(s) are implemented. In one example, this control may be dynamic, e.g., determined or implemented in conjunction with allocation requests for processes, or in conjunction with write requests. In this example, reliability controller 536 may receive indications of requested reliability schemes in conjunction with allocation requests, e.g., these indications may be included as an argument of a "malloc" call.

Suitable reliability schemes for reliability controller 536 may include SECDED coding, ECC, EDC, Chipkill coding, parity, or the like, or any suitable combination thereof. In addition, suitable reliability schemes may be defined by a number or ratio of bits allocated for data redundancy relative to bits allocated for storage of process data, or by a data redundancy characteristic, a data capacity characteristic, or a data bandwidth characteristic. Various reliability schemes may also be associated with balancing between an exposed data capacity (e.g., a portion of operating memory exposed to the requesting process) and data storage reliability for data stored in the exposed portion of the operating memory.

In response to an allocation request from a process, reliability controller 536 may be configured to allocate space in operating memory to the process, and to potentially implement a reliability scheme for the allocated space. Alternately, one or more reliability schemes may be implemented separately from allocating memory to processes. For example, reliability controller 536 could be configured to implement particular reliability scheme(s) for various portion(s) in operating memory (e.g., based on ranks, banks, devices, sectors, pages, blocks, rows, cache-lines, etc.). In this an and examples, portions of a computing device's memory may be excluded from Reliability controller 536 could then allocate operating memory to processes based on the reliability scheme to be used for that process.

Additionally, reliability controller 536 could be configured to exclude one or more portions of a computing device's operating memory from use. For example, this may include disabling use of particular ranks, banks, devices, sectors, pages, blocks, rows, cache-lines, etc. for storing reliability data, having memory controller interface the processing circuit to certain portions of operating memory without employing reliability controller 536, e.g., bypassing reliability controller 536, or the like.

In such an example, reliability controller 536 could determine one or more reliability schemes for one or more portions at a boot time of the computing device, e.g., based on configuration data stored in a basic input output system (BIOS) of the computing device. Additionally, configuration data could be based on tested reliability characteristics for the operating memory devices of the computing device, for example, using data generated during a "burn-in" of the computing device, during a power-on self-test (POST), or the like. Use of such technology could enable less resource intensive reliability schemes to be selected in response to test results indicating a lower likelihood of errors or defects in the operating memory of the computing device.

Supplemental component interface 538 is configured to interface memory controller 130 to supplemental components such as bus 140, data storage memory 150, input interface 160, output interface 170, and network adapter 180 of FIG. 1. For example, supplemental component interface 538 may provide "southbridge" features within memory controller 130.

Illustrative Processes

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as computer-readable instructions stored in a computer-readable storage medium or be performed as a computer-implemented process. As an alternate example, these processes may be encoded as computer-executable instructions and transmitted via a communications medium.

Figure 6:
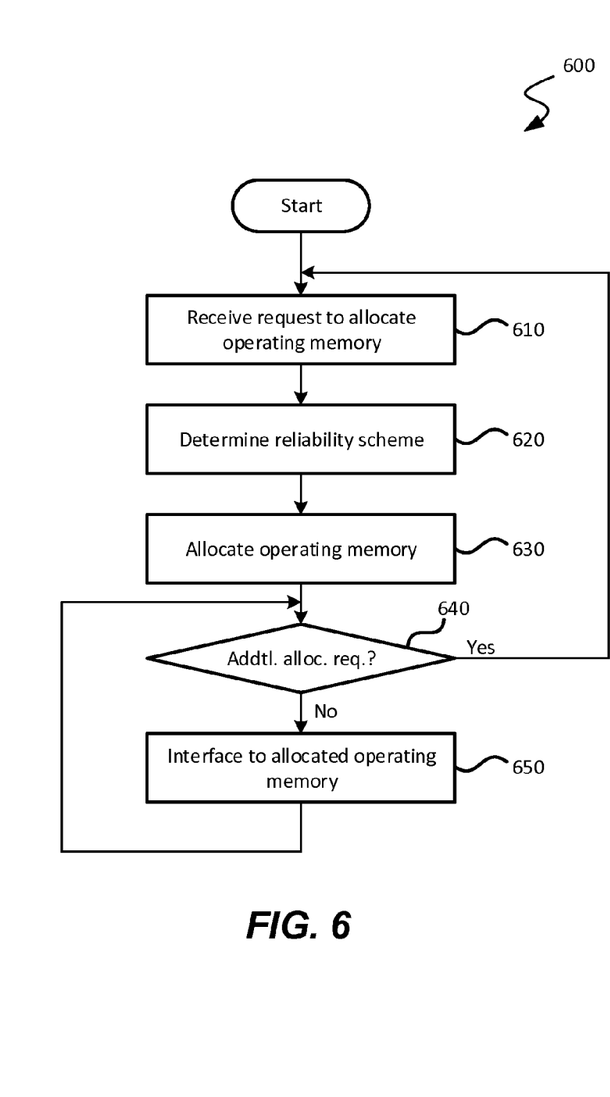
FIG. 6 is a logical flow diagram illustrating a process for memory management according to aspects of the disclosed technology.

FIG. 6 is a logical flow diagram illustrating process 600 for memory management according to aspects of the disclosed technology. Process 600 begins at 610 where a request to allocate memory to a process is received. For example, this request may be received by memory controller 130 (FIG. 1) via reliability controller 536 (FIG. 5) from a process executing on processing circuit 110 (FIG. 1). Such a request may be in response to a starting of the process, or in response to a need for more memory by that process. Also, the request may also include an indication of a criticality of the process. For example, this indication may include an indication of an SLA for the process, an indicator of effect of a failure of the process, a balancing of memory performance capacity versus (with or without accounting for the effects of memory failures), or could simply comprise an indication of a requested reliability scheme.

From 610, processing flows to 620 where at least one of a type of reliability scheme or extent for a reliability scheme is determined. For example, reliability controller 536 may determine whether a SECDED reliability scheme, an ECC reliability scheme, an EDC reliability scheme, a parity reliability scheme, or no reliability scheme is employed for the requesting process. Alternately or additionally, reliability controller 536 may determine a strength of a code to use for the process, a strength of a code to use for the reliability scheme, an amount of resources to dedicate to a selected reliability scheme, or the like. These and other determinations may be based on an indication from the requesting process, based on space available in the operating memory of the computing device, based on configuration data in BIOS, or the like.

Processing then flows to 630 where space in the operating memory is allocated to the requesting process. In one implementation, this includes providing an indication to the requesting process of the allocation, along with an indication of the implemented reliability scheme. However, in other examples, an indication of the implemented reliability scheme is not provided to the requesting process. Allocation of the operating memory to the process may also include writing an entry into a memory map or other of memory allocation database.

From 630, processing flows to 640 where, for example, reliability controller 536 determines whether memory controller 130 has received another allocation request. If so, processing returns to 610. Otherwise, processing flows to 650.

At 650, memory controller 130 interfaces data between the process and the allocated operating memory. For example, memory controller 130 may receive a write request via processor interface circuit 532, then forward a write instruction to the operating memory via memory interface circuit 534. Further, memory controller 130 may receive a read request via processor interface circuit 532, retrieve data from the operating memory via memory interface circuit 534, and provide the data to the processing circuit. From 650, processing flows to 640.

Figure 7:
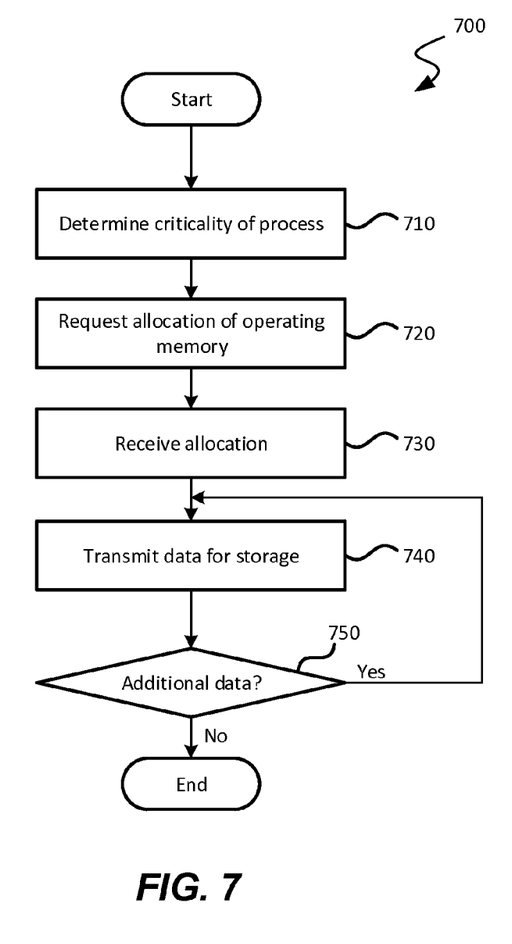
FIG. 7 is a logical flow diagram illustrating a process of operating a computing device according to aspects of the disclosed technology.

FIG. 7 is a logical flow diagram illustrating a process 700 of operating a computing device according to aspects of the disclosed technology. Process 700 begins at 710 where a criticality of a process executing on the computing device is determined. For example, processing circuit 110 (FIG. 1) may determine the criticality of the process based on uptime requirements for the process, an effect of a failure of the process, an SLA for the process, a replaceability of the data for the process, an effect of an error in the data for the process, a balancing of memory performance capacity versus (with or without accounting for the effects of memory failures), or the like. Alternately, processing circuit 110 may determine the criticality of the process from a database of process criticality data, or from an indication from the process itself.

From 710, processing flows to 720 where an allocation of space in the operating memory of the computing device is requested. For example, processing circuit 110 may transmit such a request to processor interface circuit 532 (FIG. 5) of memory controller 130 (FIG. 1). The request may also include an indication of the determined criticality of the requesting process.

Processing then flows to 730 where a notification of the allocation of space within the operating memory is received. For example, this notification may be received by the process from memory controller 130 via processor interface circuit 532. As with process 600, the notification may include an indication of the reliability scheme implemented for the process.

Processing then flows to 740 where data is transmitted to the operating memory for storage in the allocated space. For example, the process may transmit the data in a write request from processing circuit 110 to processor interface circuit 532. Memory controller 130 may then write the data to the operating memory via memory interface circuit 534.

From 740, processing flows to 750 where it is determined whether there is additional data for transmission to the operating memory. If so, processing returns to 740. Otherwise, process 700 ends.

CONCLUSION

While the above Detailed Description describes certain embodiments of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific embodiments disclosed herein, unless the Detailed Description explicitly defines such terms. Accordingly, the actual scope of the technology encompasses not only the disclosed embodiments, but also all equivalent ways of practicing or implementing the technology.

We claim:

1. A memory controller, comprising:
a memory interface configured to be coupled to a memory device;
a reliability controller configured to receive a plurality of requests, each request of the plurality of requests being a request to allocate a portion of the memory device for storage of data for a corresponding process of a plurality of processes, and in response to each of the requests, to selectively control at least one of a type of a reliability scheme to be implemented for the portion of the memory device to be allocated in response to that request or an extent to which the reliability scheme is to be implemented for the portion of the memory device to be allocated in response to that request, wherein the at least one of the type of the reliability scheme to be implemented for the portion of the memory device to be allocated in response to a first request or an extent to which the reliability scheme is to be implemented for the portion of the memory device to be allocated in response to the first request is different than the at least one of the type of the reliability scheme to be implemented for the portion of the memory device to be allocated in response to a second request or an extent to which the reliability scheme is to be implemented for the portion of the memory device to be allocated in response to the second request; and
a processor interface configured to interface data between the memory device and a processor.

2. The memory controller of claim 1, wherein the reliability controller is further configured to provide at least one of error correction coding, error detection coding, or parity for data stored in the portion of the memory device.

3. The memory controller of claim 1, wherein the reliability controller is further configured to dynamically control the at least one of the type of the reliability scheme or the extent to which the reliability scheme is to be implemented.

4. The memory controller of claim 1, wherein the reliability controller is further configured to dynamically control the type of the reliability scheme in response to each of the requests.

5. The memory controller of claim 1, wherein the reliability controller is further configured to dynamically control the extent to which the reliability scheme is to be implemented in response to the each of the requests.

6. The memory controller of claim 1, wherein the reliability scheme includes at least one definition of bits allocated for data redundancy relative to bits allocated for primary data storage use.

7. The memory controller of claim 1, wherein the reliability scheme includes at least one definition of a data redundancy characteristic, a data capacity characteristic, or a data bandwidth characteristic.

8. The memory controller of claim 1, wherein the reliability scheme is associated with a balancing between a data capacity of at least the portion of the memory device and data storage reliability for data stored in the portion of the memory device.

9. The memory controller of claim 1, wherein the memory controller is a component of a processor interface integrated circuit or on a processor integrated circuit.

10. The memory controller of claim 1, wherein the memory controller is configured to implement multiple types of reliability schemes, or to implement multiple extents to which the reliability schemes are to be implemented, for different portions of the memory device.

11. The memory controller of claim 1, wherein the memory controller is configured to implement multiple types of reliability schemes, or to implement multiple extents to which the reliability schemes are to be implemented, with a per-cache-line granularity or a per-page granularity.

12. A method of memory management, comprising:
receiving, by a hardware-based memory manager, a request to allocate memory to a process;
in response to the receiving of the request, determining, by the hardware-based memory manager, at least one of a type of a reliability scheme to be implemented for the memory for the process or an extent to which the reliability scheme is to be implemented for the memory for the process; and
allocating the memory to the process;
receiving, by the hardware-based memory manager, another request to allocate memory to another process;
in response to the receiving of the other request, determining, by the hardware-based memory manager, at least one of the type of the reliability scheme to be implemented for the memory for the other process or the extent to which the reliability scheme is to be implemented for the memory for the process, wherein the determined at least one of the type of reliability scheme for the memory allocated for the process or the extent which the reliability scheme is implemented for the memory allocated for the process is different than the determined at least one of the type of reliability scheme for the memory allocated for the other process or the extent which the reliability scheme is implemented for the memory allocated for the other process; and
allocating the memory to the other process.

13. The method of claim 12, further comprising:
interfacing data between process and the memory allocated for the process.

14. The method of claim 12, wherein:
the request to allocate memory to the process includes an indication of a criticality of the process; and
the determination of at least the type of a reliability scheme or the extent to which the reliability scheme is to be implemented is based on the indication of the criticality.

15. The method of claim 12, wherein:
implementing the determined at least one type of reliability scheme for the memory allocated for the process or the extent which the reliability scheme is implemented for the memory allocated for the process.

16. The method of claim 12, wherein:
the reliability scheme includes enabling storage of data received from the process in portions of a memory device intended for storage of redundancy data.

17. A method of operating a computing device, comprising:
determining a criticality of a first process executing on the computing device;
requesting, by a processor, an allocation of a first space within a memory of the computing device for the process, the request for the allocation of the first space including an indication of the determined criticality of the first process;
receiving the allocation of the first space within the memory of the computing device for the first process from a memory controller of the computing device in response to the request for the allocation of the first space, the first space within the memory being associated with a first reliability scheme corresponding to the determined criticality of the first process;
transmitting data for storage in the first space within the memory allocated for the first process;
determining a criticality of a second process executing on the computing device;
requesting, by the processor, allocation of a second space within the memory of the computing device for the second process, the request for the allocation of the second space including an indication of the determined criticality of the second process, wherein the determined criticality of the first process is different than the determined criticality of the second process;
receiving the allocation of the second space within the memory of the computing device for the second process from a memory controller of the computing device in response to the request for the allocation of the second space, the second space within the memory being associated with a second reliability scheme corresponding to the determined criticality of the second process, wherein the first reliability scheme is different than the second reliability scheme; and
transmitting data for storage in the second space within the memory allocated for the second process.

18. The method of claim 17, wherein the criticality of the first process is based on at least one of a replaceability of the data for the first process, an effect of a failure of the first process, an effect of an error in the data for the first process, or a balancing of memory performance versus capacity.

19. The method of claim 17, wherein the memory controller of the computing device is configured to determine and implement the reliability scheme for the first space within the memory allocated for the first process based on the indication of the determined criticality of the first process.

* * * * *